(12) United States Patent
Chea

(10) Patent No.: US 7,149,242 B1
(45) Date of Patent: Dec. 12, 2006

(54) COMMUNICATIONS SYSTEM FOR IMPROVING TRANSMISSION RATES AND TRANSMISSION DISTANCES OF DATA SIGNALS ACROSS COMMUNICATIONS LINKS

(75) Inventor: Woody A. Chea, Olathe, KS (US)

(73) Assignee: Bitrage, Inc., St. Augustine, FL (US)

( * ) Notice: Subject to any disclaimer, the term of this patent is extended or adjusted under 35 U.S.C. 154(b) by 1010 days.

(21) Appl. No.: 09/584,094

(22) Filed: May 31, 2000

(51) Int. Cl.
*H04B 1/38* (2006.01)
*H04L 5/16* (2006.01)

(52) U.S. Cl. ............... 375/219; 375/220; 375/225; 375/355

(58) Field of Classification Search .......... 375/285, 375/211–214, 257, 219–222, 225, 355; 455/467, 455/7, 11.1, 13.1; 370/226, 232, 293, 465
See application file for complete search history.

(56) References Cited

U.S. PATENT DOCUMENTS

| | | |
|---|---|---|
| 2,733,296 A | 1/1956 | Maggio |
| 2,833,861 A | 5/1958 | Anderson, et al. |
| 3,843,844 A | 10/1974 | Schumperli |
| 3,989,907 A | 11/1976 | Chambers, Jr. |
| 4,056,688 A | 11/1977 | Stiefel |
| 4,277,655 A | 7/1981 | Surprenant |
| 4,580,260 A | 4/1986 | Blackburn et al. |
| 4,638,473 A | 1/1987 | Cooperman et al. |
| 4,670,886 A | 6/1987 | Newcombe, Jr. et al. |
| 4,677,687 A | 6/1987 | Matsuo |
| 4,680,809 A * | 7/1987 | Hartkopf et al. ............ 398/175 |
| 4,837,788 A | 6/1989 | Bird |
| 4,870,370 A | 9/1989 | Hedberg et al. |
| 4,964,116 A | 10/1990 | Measor |
| 5,152,002 A | 9/1992 | Leslie et al. |
| 5,179,720 A | 1/1993 | Grube et al. |
| 5,195,132 A | 3/1993 | Bowker et al. |
| 5,293,405 A * | 3/1994 | Gersbach et al. ........... 375/232 |
| 5,367,273 A | 11/1994 | Georger et al. |
| 5,422,950 A | 6/1995 | Miller et al. |
| 5,483,372 A | 1/1996 | Green, Jr. |
| 5,528,281 A | 6/1996 | Grady et al. |
| 5,537,680 A | 7/1996 | Bruno |

(Continued)

FOREIGN PATENT DOCUMENTS

DE  0 719 006 A1 *  6/1996

OTHER PUBLICATIONS

Gottlieb,A.M., A DSP-based research prototype reverse channel transmitter/receiver for ADSL, Apr. 19-22,1994, 1994 IEEE International Conference, vol. iii, pp. III/253-III/256 vol. 3.*

(Continued)

*Primary Examiner*—Emmanuel Bayard
*Assistant Examiner*—Lawrence B. Williams
(74) *Attorney, Agent, or Firm*—Pillsbury Winthrop Shaw Pittman LLP (57) ABSTRACT

A communications system includes a transmitter device, a receiver system, and a communications link. The communications link couples the transmitter device and the receiver system. The receiver system includes a receiver device and a processor. The transmitter device transmits a data signal. The receiver device receives the data signal from the communications link. The processor is electrically coupled to the receiver device to receive the data signal. The processor regenerates the data signal to compensate for the effects of the communications link on the data signal. Then, the processor outputs the regenerated data signal.

5 Claims, 6 Drawing Sheets

U.S. PATENT DOCUMENTS

| | | | |
|---|---|---|---|
| 5,541,640 A | 7/1996 | Larson | |
| 5,557,669 A | 9/1996 | Perry et al. | |
| 5,557,670 A | 9/1996 | Perry et al. | |
| 5,617,240 A * | 4/1997 | Hergault et al. | 398/209 |
| 5,621,455 A | 4/1997 | Rogers et al. | |
| 5,625,404 A | 4/1997 | Grady et al. | |
| 5,708,703 A | 1/1998 | Nagaraj | |
| 5,734,643 A | 3/1998 | Rondeau | |
| 5,751,114 A | 5/1998 | Dingsor | |
| 5,751,338 A | 5/1998 | Ludwig, Jr. | |
| 5,761,194 A | 6/1998 | Bahlenberg | |
| 5,761,245 A | 6/1998 | Haukkavaara et al. | |
| 5,778,303 A | 7/1998 | Shinozaki et al. | |
| 5,786,844 A | 7/1998 | Rogers et al. | |
| 5,796,781 A * | 8/1998 | DeAndrea et al. | 375/288 |
| 5,801,695 A | 9/1998 | Townshend | |
| 5,809,075 A | 9/1998 | Townshend | |
| 5,821,987 A | 10/1998 | Larson | |
| 5,835,538 A | 11/1998 | Townshend | |
| 5,872,809 A | 2/1999 | Batruni | |
| 5,875,210 A | 2/1999 | Brief et al. | |
| 5,883,884 A | 3/1999 | Atkinson | |
| 5,898,761 A | 4/1999 | McHale et al. | |
| 5,903,372 A | 5/1999 | Czerwiec | |
| 5,905,781 A | 5/1999 | McHale et al. | |
| 5,940,403 A | 8/1999 | Williams | |
| 5,963,549 A | 10/1999 | Perkins et al. | |
| 5,978,371 A | 11/1999 | Mason, Jr. et al. | |
| 6,016,304 A | 1/2000 | Kyle et al. | |
| 6,137,524 A * | 10/2000 | Chea | 725/144 |
| 6,178,179 B1 * | 1/2001 | Phillips et al. | 370/465 |
| 6,181,711 B1 * | 1/2001 | Zhang et al. | 370/468 |
| 6,456,649 B1 * | 9/2002 | Isaksson et al. | 375/222 |
| 2003/0066088 A1 * | 4/2003 | Jung | 725/111 |

OTHER PUBLICATIONS

Jones, D.C., Signal Processing design for an ADSL high speed equalizer, May 1-5, 1994, IEEE International Conference, vol. 1, pp. 283-287.*

Nakagawa et al., 10 Gbit/s, 285 km Repeaterless Optical Transmission Experiment with a Highly Sensitive Optical Premplifier, Jan. 4, 1996, Electronic Letters vol. 32, Issue 4, pp. 48-49.*

Nakagawa et al., 10 Gbit/s, Repeaterless Optical Transmission over 258 km Employing 24 ps RZ Pulses, Feb. 25-Mar. 1, 1996, Optical Fiber Communications, OFC '96, pp. 15-16.*

Nakagawa et al., Long-Span Repeaterless IM/DD Optical Transmission Experiment Over 300 km Using Optical Amplifiers, Jun. 23-26, 1991, IEEE International Conference on Communications, vol. 3, pp. 1228-1232.*

"Pulse-Code Modulation (PCM)", Roger L. Freeman, Telecomunnications System Engineering, 3rd Edition, (1989), (1996), pp. 382-392.

"Introduction to Transmission for Telephony", Roger L. Freeman, Telecommunications System Engineering, 3rd Edition, (1989), (1996), pp. 181-195.

"Exchange Location", Roger L. Freeman, Telecomunnications System Engineering, 3rd Edition, (1989), (1996), pp. 220-237.

"Digital Transmission Systems", Roger L. Freeman, Telecomunnications System Engineering, 3rd Edition, (1989), (1996), pp. 339-366.

"Introduction to Sonet", www/tektronix.com/Measurement/App_Notes/SONET/sonet.html, May 17, 2000, pp. 1-3.

"Sonet Telecommunications Standard Primer", www/tektronix.com/Measurement/App_Notes/SONET/sonet.html, May 17, 2000, pp. 1-3.

"DSO-DS3-Digital Signal Services Available Over T1, T2, and T3 Signaling Systems, Digital Signal Levels", http://mirrors.iquest.net/telco/EE535/hwk11cd95/catman/dslevels.html, May 15, 2000, pp. 1-2.

"DSO-DS3-Ditigal Signal Services Available Over T1, T2, and T3 Signaling Systems, DS1-Digital Signal Level 1", http://mirrors.iquest.net/telco/EE535/hwk11cd95/catman/ds1.html, May 15, 2000, pp. 1-11.

"DSO-DS3-Ditigal Signal Services Available Over T1, T2, and T3 Signaling Systems, DS2-Ditigal Signal Level 2", http://mirrors.iquest,net/telco/EE535/hwk11cd95/catman/ds2.html, May 15, 2000, pp. 1-2.

"DSO-DS3-Ditigal Signal Services Available Over T1, T2, and T3 Signaling Systems, Pulse Stuffing or Justification", http://mirrors.iquest,net/telco/EE535/hwk11cd95/catman/stuffing.html, May 15, 2000, pp. 1-2.

DSO-DS3-Ditigal Signal Services Available Over T1, T2, and T3 Signaling Systems, Jitter and Wander, http://mirrors.iquest.net/teleco/EE535/hwk11cd95/catman/jitter.html, May 15, 2000, p. 1.

DSO-DS3-Ditigal Signal Services Available Over T1, T2, and T3 Signaling Systems, DS1C-Digital Signal Level 1C, http://mirrors.iquest.net/telco/EE535/hwk11cd95/catman/ds1c.html, May 15, 2000, pp. 1-2.

* cited by examiner

COMMUNICATIONS SYSTEM FOR IMPROVING TRANSMISSION RATES AND TRANSMISSION DISTANCES OF DATA SIGNALS ACROSS COMMUNICATIONS LINKS

BACKGROUND OF THE INVENTION

1. Field of the Invention

This invention generally relates to the field of communications. More particularly, the present invention relates to a communications system that improves transmission rates and transmission distances of data signals across communications links.

2. Description of Related Art

Advances in computer capabilities as well as the unprecedented growth of Internet-related transactions have placed great demands on conventional communication infrastructures to convey data to subscribers at higher transmission rates with increased reliability and levels of service. Although conventional infrastructures communicate at higher transmission rates, such as DS-3 (e.g., 45 Mbps) and OC-3 (e.g., 155 Mbps), between networked hubs, they are generally limited in their ability to accommodate such ample bandwidths between the hubs and subscribers. Such limitations arise from the infrastructures' inability to compensate for degradations encountered on conventional transmission media spanning distances of up to 18,000 ft. between the hubs and subscribers.

Consider, for example, how common carriers provide connectivity to subscribers. Typically, carrier hubs or central offices connect to subscribers via subscriber loop circuits. Subscriber loop circuits generally comprise 2-wire transmission paths (i.e., unshielded twister pairs—UTP), which support direct current signals, low frequency (<~200 Hz) analog signals, and voice band signals (~200 Hz—~3.4 KHz). These frequencies limit the transmission rate of digitally-encoded signals on the 2-wire transmission paths. Further, the longer the distances traversed by the signals on the 2-wire transmission paths, the more severe the degradation of the signals; thus, this limits the transmission rates.

To increase the transmission rates on the 2-wire transmission paths, asymmetric digital subscriber lines (ADSLs) have been developed. ADSLs combine channelization (e.g., discrete multi-tone DMT), coding (e.g., constellation/trellis encoding), and framing (e.g., super-framing) techniques to achieve upstream digital rates between 64–640 Kbps and download digital rates between 500 Kbps–7 Mbps. The ability to attain these transmission rates, however, is dependent on transmission distance. ADSLs are also sensitive to line-quality and line configurations. As a result, the higher transmission rates are available only to subscribers with "clean lines," which are within specific distances (e.g., 8,000–10,000 ft.) from the central office. Other approaches to increase the transmission rates on the 2-wire transmission paths include line-conditioning, which increases the line-quality of a local loop. While such conditioning provides moderate improvement in transmission rates, it is line and transmission distance dependent. Accordingly, there is a need in the art for a communications system that improves transmission rates and transmission distances of data signals across communications links.

SUMMARY OF THE INVENTION

In one embodiment of the present invention, a communications system includes a transmitter device, a receiver system, and a communications link. The transmitter device transmits a data signal. The receiver system receives and regenerates the data signal. The communications link couples the transmitter device and the receiver system. During transmission across the communications link, the data signal is susceptible to distortions of phase and amplitude. The receiver system includes a receiver device and a processor. The receiver device receives the potentially distorted data signal from the communications link. The processor is electrically coupled to the receiver device to receive the distorted data signal. The processor regenerates the data signal to compensate for the effects of the communications link on the data signal. Then, the processor outputs the regenerated data signal.

BRIEF DESCRIPTION OF THE DRAWINGS

In the drawings, like reference numerals represent similar parts of the present invention throughout the several views and wherein.

DETAILED DESCRIPTION

Figure 1:
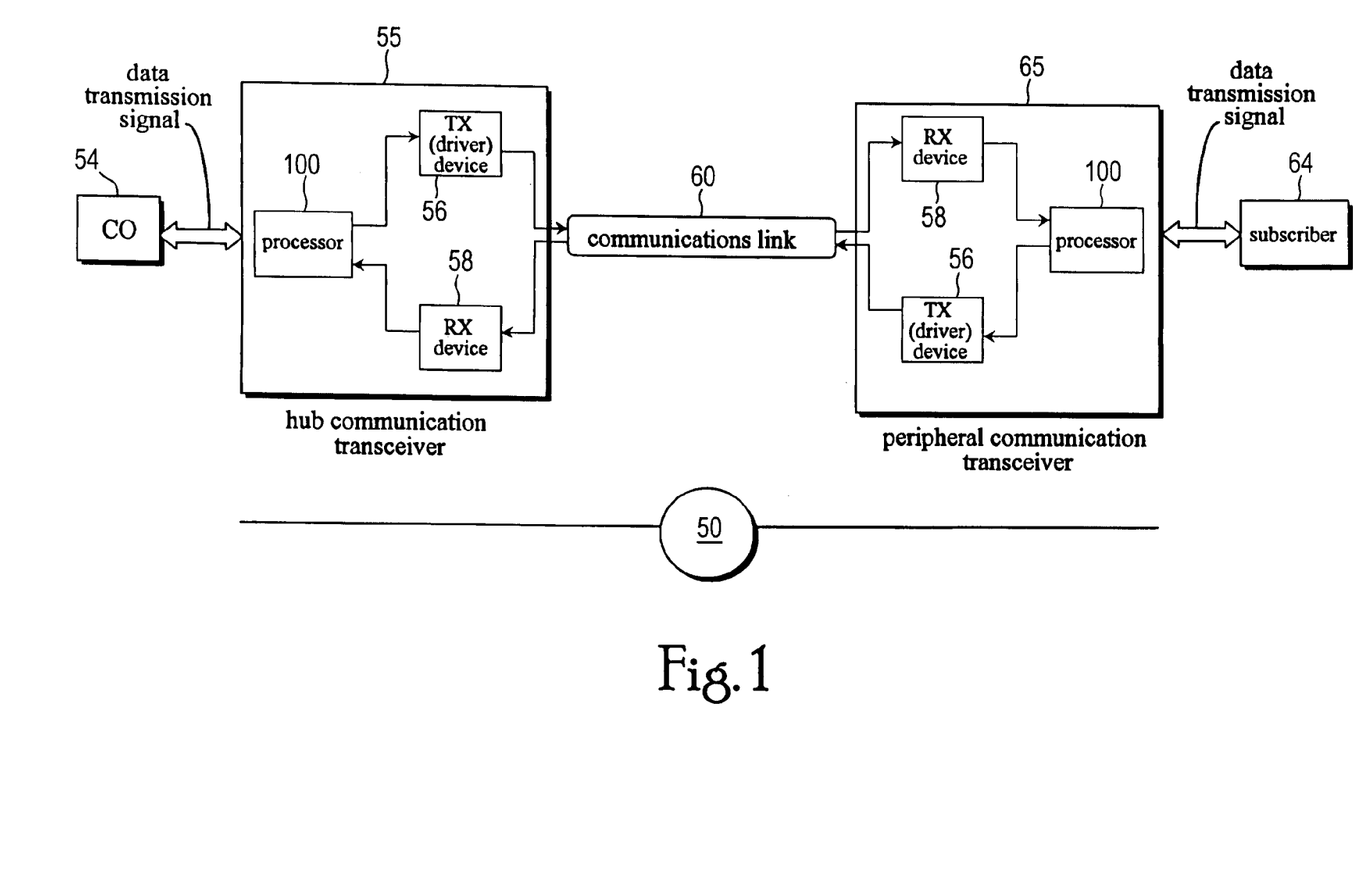
FIG. 1 is a functional block diagram depicting a communications system in accordance with an exemplary embodiment of the present invention.

FIG. 1 illustrates exemplary communications system 50, which includes a hub communication transceiver 55, a peripheral communication transceiver 65, and a communications link 60. Hub communication transceiver 55 and peripheral communication transceiver 65 receive, regenerate, and transmit data signals. Communications link 60 couples hub communication transceiver 55 and peripheral communication transceiver 65, and comprises a conventional communications media, such as unshielded twisted pair (UTP) cables, coaxial cables, or fiber-optic cables. Communications link 60 spans distances at least as long as 18,000 ft. This embodiment of communications system 50 allows for high transmission rates, such as 44.736 Mbps (i.e., DS-3), and 155 Mbps (i.e., OC-3).

Hub communication transceiver 55 comprises a transmitter device (i.e., driver device) 56, a receiver device 58, and a processor 100. Hub communication transceiver 55 is coupled to a transmission facility (i.e, central office/node (CO)) 54, which, for example, transmits a data signal destined for a subscriber 64. The data signal, such as a pulse code modulated (PCM) signal, carries digitally-encoded data. It should be noted that the data signal is susceptible to distortions during transmission across the communications media. Such distortions may affect certain attributes of the data signal, such as phase and amplitude. A receiver device (not shown) receives the data signal from CO 54. Processor 100 is electrically coupled to the receiver device, driver device 56, and receiver device 58. In this configuration, processor 100 receives the potentially distorted data signal from the receiver device, regenerates the data signal, and outputs the regenerated data signal. Simply put, processor 100 is configured to receive a distorted data signal, to decompose the distorted data signal into component signals, to process the component signals to compensate for the effects of the communications media on the data signal, and to combine the component signals to regenerate the data signal. Then, driver device 56 transmits the regenerated data signal to peripheral communication transceiver 65 across communications link 60. In the specific embodiment illustrated herein, processor 100 comprises a communication processor as disclosed in the commonly-assigned copending application filed on even date herewith and issuing as U.S. Pat. No. 6,823,001 in the name of Woody A. Chea, entitled "Dual Stage Communication Processor," the content of which is hereby expressly incorporated herein in its entirety.

Similarly, peripheral communication transceiver 65 comprises a transmitter device (i.e., driver device) 56, a receiver device 58, and a processor 100. Peripheral communication transceiver 65 is coupled to a transmission facility (i.e., subscriber) 64, which, for example, receives the data signal. Receiver device 58 receives the data signal from hub communication transceiver 55. Processor 100 is electrically coupled to receiver device 58, transmitter device (i.e., driver device) (not shown), and driver device 56. In this configuration, processor 100 receives the potentially distorted data signal from receiver device 58, regenerates the data signal, and outputs the regenerated data signal. As stated above, processor 100 is configured to receive a distorted data signal, to decompose the distorted data signal into component signals, to process the component signals to compensate for the effects of the communications media on the data signal, and to combine the component signals to regenerate the data signal. Then, the driver device transmits the regenerated data signal to subscriber 64.

At the peripheral end of communications link 60, subscriber 64 may transmit a data signal destined for CO 54. That is, a receiver device (not shown) of peripheral communication transceiver 65 receives the data signal from subscriber 64. Processor 100 is electrically coupled to the receiver device, and receives the potentially distorted data signal from the receiver device, regenerates the data signal, and outputs the regenerated data signal. Then, driver device 56 transmits the regenerated data signal to hub communication transceiver 55 across communications link 60. Receiver device 58 of hub communication transceiver 55 receives the data signal from peripheral communication transceiver 65. Processor 100 of hub communication transceiver 55 is electrically coupled to a transmitter device (i.e., driver device) (not shown), and receives the potentially distorted data signal from receiver device 58, regenerates the data signal, and outputs the regenerated data signal. Then, the driver device transmits the regenerated data signal to CO 54.

In short, communications system 50 allows transporting data signals at higher transmission rates across longer transmission distances of conventional communications media than is currently possible.

Figure 2:
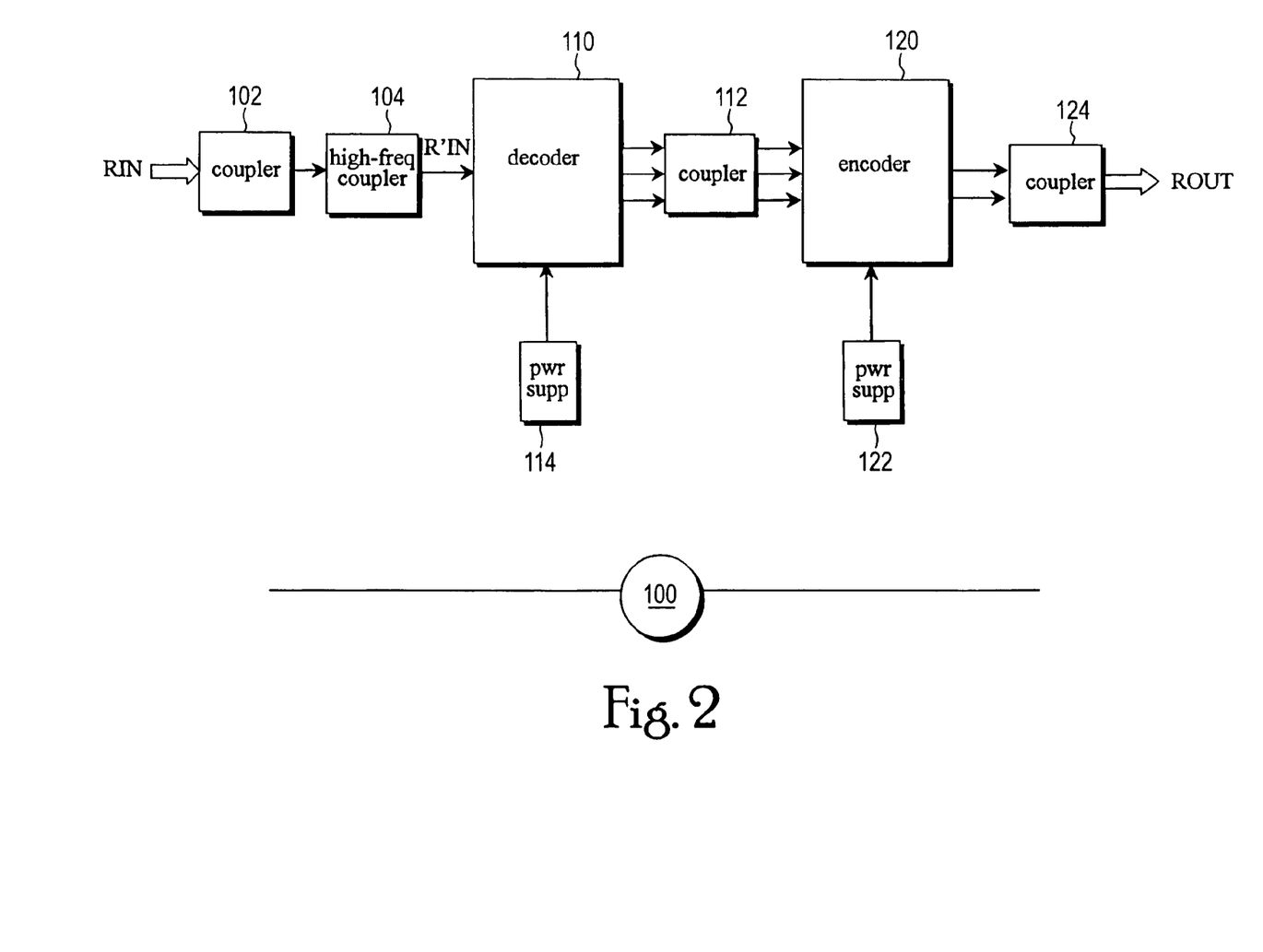
FIG. 2 is a functional block diagram depicting a processor in accordance with an exemplary embodiment of the present invention.

FIG. 2 illustrates an embodiment of processor 100. Processor 100 comprises a coupler 102, a coupler 104, a decoder 110, a power supply 114, a coupler 126, an encoder 120, a power supply 122, and a coupler 124. Coupler 102, which includes impedance matching capabilities, receives the potentially distorted data signal RIN. Coupler 102 includes a 75 ohms resistor that matches the impedance of communications link 60, for example. The coupled data signal RIN is supplied to coupler 104, which comprises a high-frequency coupler to filter high-frequency components of data signal RIN. The output of coupler 104 is supplied to decoder 110, which generates potentially distortionless component digital data signals and a clock based on the filtered data signal R'IN from coupler 104. Power supply 114 powers decoder 110, and implements noise dampening circuitry to reduce the effects of noise. The component digital data signals and clock of decoder 110 are supplied to encoder 120 via coupler 112. Encoder 120 generates analog signals based on the component digital data signals from decoder 110. Power supply 122 powers encoder 120, and implements noise dampening circuitry to reduce the effects of noise. Coupler 124 selectively outputs regenerated data signal ROUT from at least one of the analog signals. It should be noted that regenerated data signal ROUT is cleaner than data signal RIN. As a result, regenerated data signal ROUT may be transmitted across communications link 60 over longer distances than data signal RIN.

Figure 3:
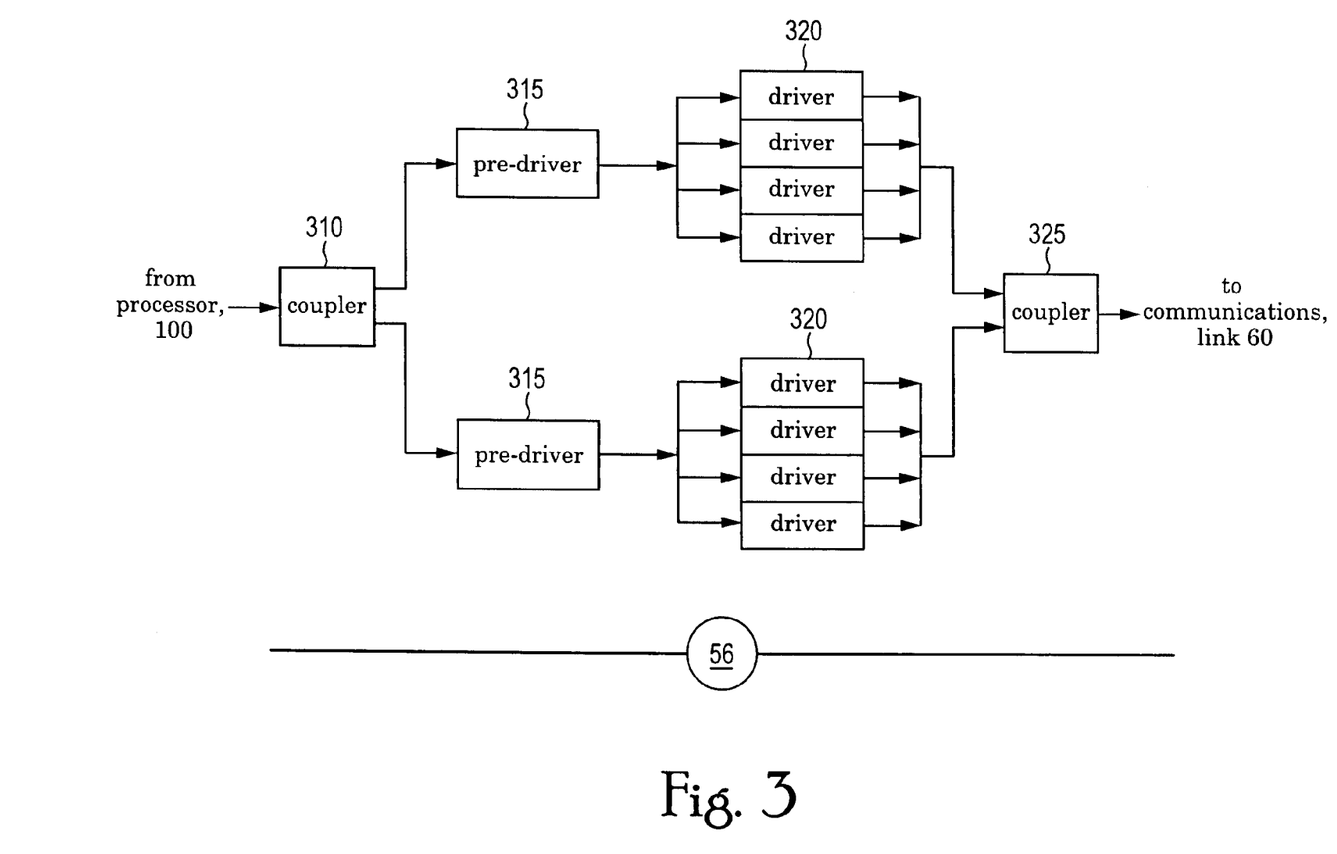
FIG. 3 is a function block diagram depicting a driver device in accordance with an exemplary embodiment of the present invention.

FIG. 3 illustrates an embodiment of driver device 56. Driver device 56 comprises a coupler 310, a pair of pre-drivers 315, a pair of driver sets 320, and a coupler 325. Coupler 310 comprises a transformer having a center pin grounded. Coupler 310 receives the regenerated data signal ROUT and outputs signals similar to ROUT to each of pre-drivers 315, except that the outputted signals are 180 degrees out of phase relative to each other. Pre-drivers 315, configured as wide band amplifiers, amplify the outputted signals of coupler 310. The wide band amplifiers may be configured as current or voltage amplifiers.

Pre-drivers 315 are coupled to driver sets 320. Driver set 320 comprises a plurality of drivers that are configured in parallel. The drivers of driver set 320 are amplifiers, such as 100 mA, 18–20 V peak-to-peak amplifiers. Driver sets 320 improve signal gain and reduce susceptibility of the drivers of driver sets 320 to saturate. Driver sets are 320 coupled to coupler 325. Coupler 325 comprises a transformer having an ungrounded center pin, and is configured to combine the signals from driver sets 320 to provide a data signal capable of being transmitted across communications link 60.

Figure 4:
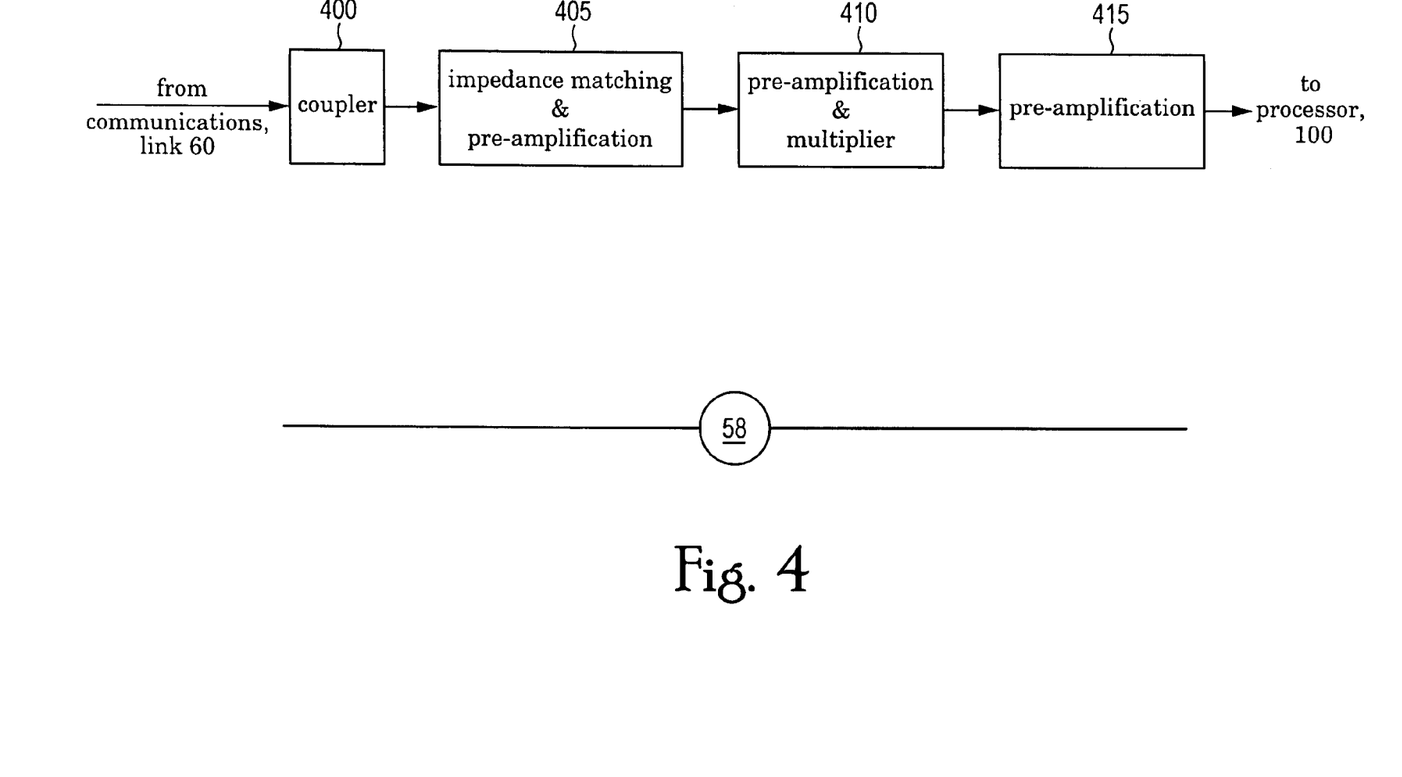
FIG. 4 is a function block diagram depicting a receiver device in accordance with an exemplary embodiment of the present invention.
Figure 5:
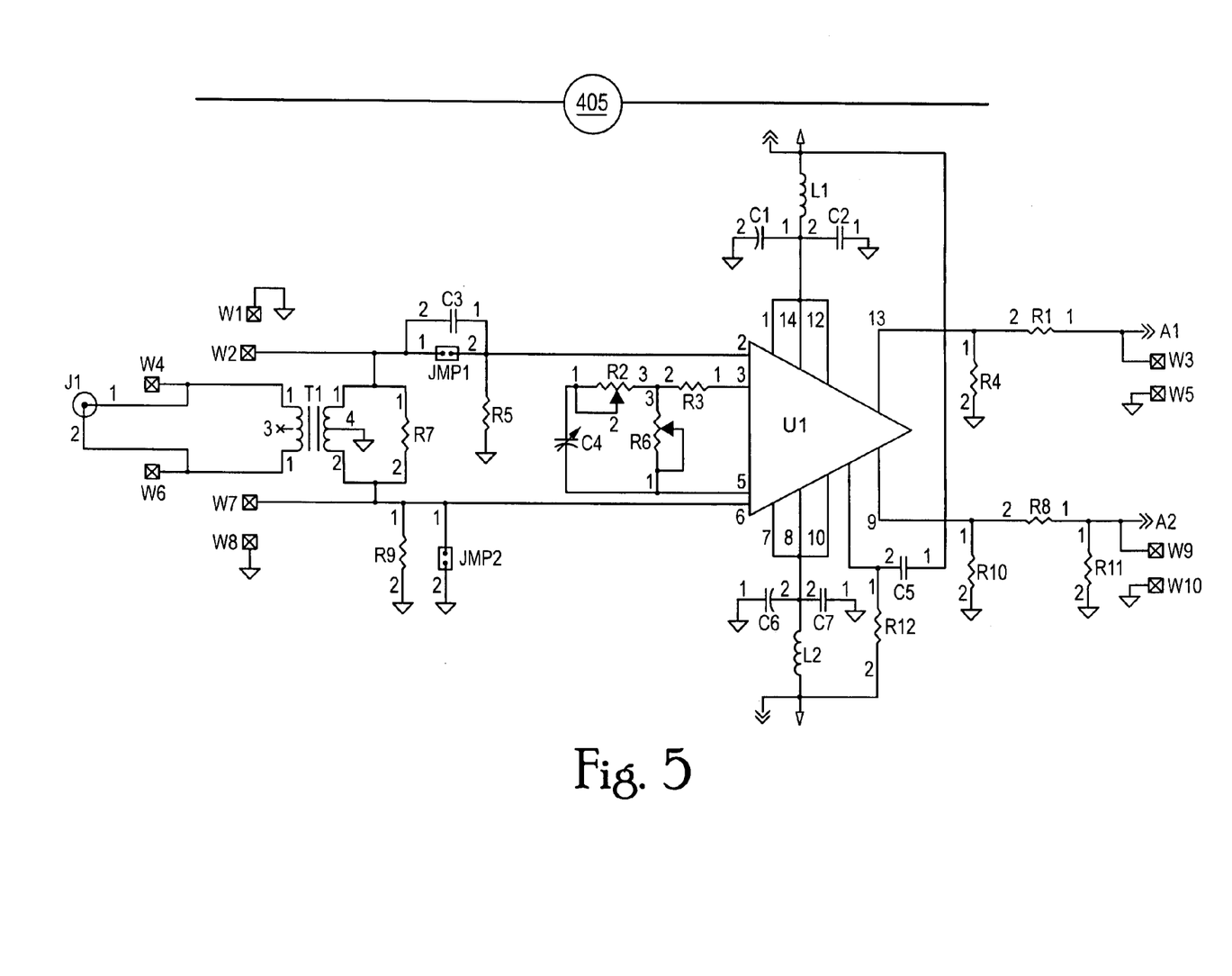
FIG. 5 is a schematic diagram depicting an embodiment of a circuit of FIG. 4.
Figure 6:
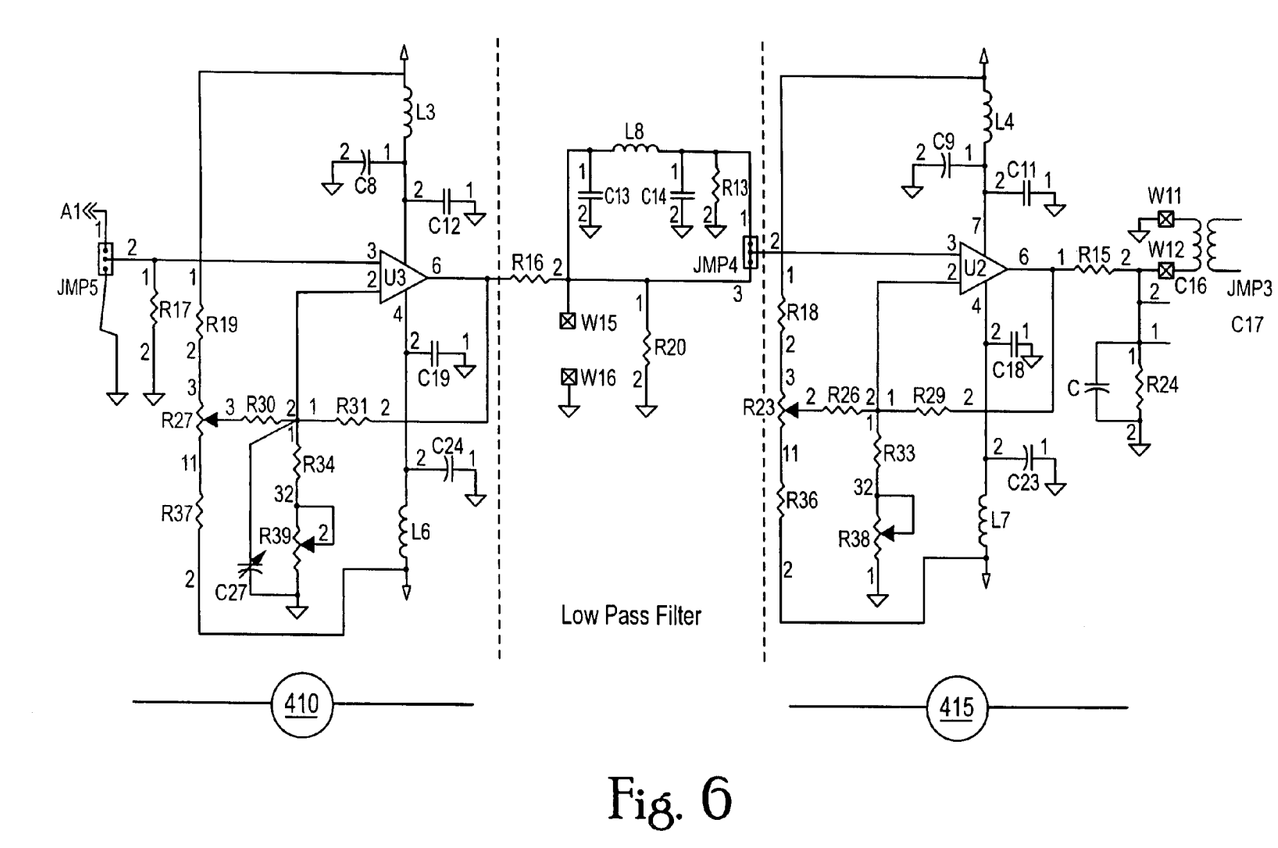
FIG. 6 is a schematic diagram depicting an embodiment of a circuit of FIG. 4.

FIG. 4 illustrates an embodiment of receiver device 58. Receiver 58 comprises a coupler block 400, impedance matching and pre-amplification block 405, pre-amplification and multiplier block 410, and pre-amplification block 415. Coupler block 400 receives the transmitted data signal. Coupler block 400 comprises a transformer having a grounded center pin. Impedance matching and pre-amplification block 405, which is schematically illustrated in FIG. 5, is coupled to coupler block 400, and comprises a resistor to match the impedance of communications link 60, and a pre-amplification circuit with high frequency adjustments. Pre-amplification and multiplier block 410, which is schematically illustrated in FIG. 6, is coupled to impedance matching and pre-amplification block 405, and comprises a common mode rejection multiplier configuration. Also, pre-amplification and multiplier block 410 is coupled to pre-amplification block 415 via a low pass filter. Pre-amplification block 415, which is schematically illustrated in FIG. 6, outputs the data signal to processor 100.

In sum, communications system 50 allows transporting data signals at higher transmission rates across longer transmission distances of conventional communications media than is currently possible. Although this invention has been shown in relation to a particular embodiment, it should not be considered so limited. Rather, the invention is limited only by the scope of the appended claims and their equivalents.

What is claimed is:

1. A system comprising:
a driver device adapted to transmit a data signal, the data signal having transmission rates at least as high as 44.736 Mbps;
a communications link coupled to the driver device and the receiver device, the data signal being susceptible to distortions of phase and amplitude during transmission across the communications link, the communications link being at least 18,000 feet long; and
a receiver system adapted to receive, regenerate and transmit the data signal, the receiver system including:
a receiver device adapted to receive the data signal from the communications link, and
a processor electrically coupled to the receiver device and adapted to receive the distorted data signal from the receiver device, regenerate the data signal to compensate for effects of the communications link on the data signal, and output the regenerated data signal, wherein the processor includes:
(a) a decoding mechanism configured to:
(i) produce a corrected data signal from the data signal,
(ii) split the corrected data signal into component data signals,
(iii) generate a data clock reference signal based on the data signal and a clock reference signal substantially matching a transmission rate of the received distorted data signal, and
(iv) convert said component data signals into digital component data signals synchronized to said data clock reference signal, and
(b) an encoding mechanism configured to:
(i) receive said digital component data signals synchronized to said data clock reference signal;
(ii) convert said synchronized digital component data signals as output signals; and
(iii) transmit at least one of the output signals as the regenerated data signal.

2. The system of claim 1, wherein the receiver system further comprises a driver device electrically coupled to the processor and adapted to transmit the regenerated data signal to a subscriber.

3. The system of claim 1, wherein the receiver system further comprises a driver device electrically coupled to the processor and adapted to transmit the regenerated data signal to a central node.

4. The system of claim 1, wherein the data signal comprises digitally encoded data signal.

5. The system of claim 1, wherein the communications link comprises at least one of unshielded twisted pair cable, coaxial cable, and fiber optic cable.

* * * * *